United States Patent
Fawcett, Jr.

(10) Patent No.: US 8,141,208 B2
(45) Date of Patent: Mar. 27, 2012

(54) ASSEMBLABLE JERK HANDLE FOR INFLATORS

(75) Inventor: Lyman W. Fawcett, Jr., St. Petersburg, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 185 days.

(21) Appl. No.: 12/435,760

(22) Filed: May 5, 2009

(65) Prior Publication Data

US 2009/0255088 A1 Oct. 15, 2009

Related U.S. Application Data

(63) Continuation of application No. 10/935,938, filed on Sep. 8, 2004, now Pat. No. 7,861,373.

(60) Provisional application No. 60/501,289, filed on Sep. 8, 2003.

(51) Int. Cl.
  *B25G 3/32* (2006.01)
(52) U.S. Cl. ............ 16/422; 16/428
(58) Field of Classification Search ........... 16/428, 16/422, 426, 441, 443; 24/265 EC, 115 R, 24/115 M, 136 R, 130; 123/185.2, 185.3; 441/41, 69, 90; 403/320, 409.1; 482/81–82
See application file for complete search history.

(56) References Cited

U.S. PATENT DOCUMENTS

| | | | |
|---|---|---|---|
| 656,993 A * | 8/1900 | Mossman | 24/136 R |
| 948,367 A * | 2/1910 | Berry | 294/132 |
| 992,821 A * | 5/1911 | Stewart | 174/135 |
| 1,535,546 A | 4/1925 | Regar | |
| 1,720,037 A | 7/1929 | Entwistle et al. | |
| 2,148,173 A | 2/1939 | Rogoff | |
| 3,163,902 A * | 1/1965 | Bernburg et al. | 403/369 |
| 3,351,986 A | 11/1967 | Johnson | |
| 3,574,900 A | 4/1971 | Emery | |
| 3,952,377 A * | 4/1976 | Morell | 24/136 R |
| 3,989,580 A | 11/1976 | Hoback et al. | |
| 4,002,822 A | 1/1977 | Kurosaki | |
| 4,019,490 A * | 4/1977 | Reese | 123/185.2 |
| 4,302,869 A | 12/1981 | Hackney et al. | |
| 4,430,523 A * | 2/1984 | Hayes | 174/135 |
| 4,455,717 A * | 6/1984 | Gray | 24/115 R |

(Continued)

FOREIGN PATENT DOCUMENTS

CN 1143170 2/1997

(Continued)

OTHER PUBLICATIONS

European Search Report, Aug. 15, 2006, App. No. 04783356.1.

*Primary Examiner* — Victor Batson
*Assistant Examiner* — Roberta Delisle
(74) *Attorney, Agent, or Firm* — Gray Robinson, P.A.

(57) ABSTRACT

An assemblable jerk handle for a lanyard cord including in one embodiment a base portion having a center channel with interior progressive teeth for receiving the lanyard cord and a cap portion for permanently snap-fitting to the base portion to securely grip and therefore retain the lanyard cord within the base portion. In another embodiment, the assemblable jerk handle comprises a base portion having a center channel positioned therethrough for receiving a bifurcated plug that receives the lanyard cord therein and forcibly closes about the lanyard cord to securely grip and therefore retain the lanyard cord within the base portion.

6 Claims, 9 Drawing Sheets

U.S. PATENT DOCUMENTS

| | | | |
|---|---|---|---|
| 4,872,626 A * | 10/1989 | Lienart | 248/63 |
| 5,099,546 A | 3/1992 | Mackal | |
| 5,245,730 A * | 9/1993 | Martin | 24/132 R |
| 5,278,353 A | 1/1994 | Buchholz et al. | |
| 5,283,930 A * | 2/1994 | Krauss | 24/129 R |
| 5,347,685 A | 9/1994 | Mackal | |
| 5,421,075 A * | 6/1995 | Mackal | 29/432 |
| 5,503,049 A | 4/1996 | Chervenak | |
| 5,671,508 A * | 9/1997 | Murai | 24/115 K |
| 6,044,527 A * | 4/2000 | Ishida et al. | 24/129 R |
| 6,163,936 A * | 12/2000 | Benoit | 24/130 |
| 6,279,795 B1 | 8/2001 | Pierzina | |
| 6,618,910 B1 | 9/2003 | Pontaoe | |

FOREIGN PATENT DOCUMENTS

| | | |
|---|---|---|
| FR | 2149016 | 3/1973 |
| FR | 2735955 | 1/1997 |
| JP | 8332104 | 12/1996 |
| JP | 3394849 | 4/2003 |

* cited by examiner

FIG. 1
FRONT

FIG. 2
REAR

FIG. 3
TOP

FIG. 4
BOTTOM

FIG. 5
TOP EXPLODED

FIG. 6
BOTTOM EXPLODED

FIG. 7
INSIDE BASE

FIG. 8
INSIDE CAP

ASSEMBLABLE JERK HANDLE FOR INFLATORS

CROSS-REFERENCE TO RELATED APPLICATIONS

This application is a continuation of application Ser. No. 10/935,938, filed Sep. 8, 2004 now U.S. Pat. No. 7,861,373, which claims priority of provisional application No. 60/501,289, filed Sep. 8, 2003, the disclosures of which are hereby incorporated by reference herein.

BACKGROUND OF THE INVENTION

1. Field of the Invention

This invention relates to jerk handles for lanyards of manual inflators or the manual portion of automatic inflators.

2. Description of the Background Art

As the term is commonly employed, a "jerk handle" is a handle connected to the trailing end of a lanyard composed of a cord. The standing end of the lanyard cord is then operatively connected to a device that requires manual actuation upon pulling of the jerk handle. A common application for jerk handles is in the inflation art. In the inflation art, a manual inflator (or the manual portion of an automatic inflator) is connected to an inflation valve of a cartridge of compressed gas. The assembly is then sealingly connected to an article to be inflated. Typical articles may include an inflatable life vest or life raft. To inflate, the user simply grasps the jerk handle and gives it a jerk to manually actuate the inflator causing inflation of the inflatable article.

Heretofore, the trailing end of a length of lanyard cord is molded in situ with the jerk handle to form the lanyard. U.S. Pat. No. 5,099,546, the disclosure of which is hereby incorporated by reference herein, discloses a mold-in-situ jerk handle for inflators. In this form, the lanyard is typically shipped to the manufacturer of the inflator who then assembles it by operatively coupling the standing end of the lanyard cord to the inflator in a manner dictated by the particular design of the inflator itself.

It is often desirous to have a supply of lanyards with different lengths of cords and therefore there exists a need in the industry for the ability for the inflator manufacturer to assemble the jerk handle to the trailing end of the cord as needed instead of having to purchase the assembly molded in situ. U.S. Pat. No. 5,347,685, the disclosure of which is hereby incorporated by reference herein, discloses an assemblable jerk handle comprising a channel in which the lanyard cord is positioned and then secured by means of a strip with spikes that snap-fit into the channel to "spike" the lanyard cord and hold it in position. However, a more durable assemblable jerk handle is needed that more securely retains the lanyard cord and that is not disassemblable once assembled.

Therefore, it is an object of this invention to provide an improvement which overcomes the aforementioned inadequacies of the prior art devices and provides an improvement which is a significant contribution to the advancement of the inflation art.

Another object of this invention is to provide a jerk handle that may be permanently affixed about the trailing end of a lanyard cord by a simple coupling of two components together to securely and permanently grasp the cord therebetween.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, the first embodiment of this invention comprises an assemblable jerk handle composed of two pieces that snap together to securely retain a lanyard cord therebetween. More particularly, the jerk handle of the invention comprises a base portion having interior progressive teeth forming a channel for receiving the lanyard cord and a cap portion for permanently snap-fitting to the base portion whereupon the lanyard cord is forcibly entrained by the teeth to securely and permanently grasp the lanyard cord.

The second embodiment of this invention comprises an assemblable jerk handle including a base portion having a center channel positioned therethrough for receiving a bifurcated plug. During assembly, the trailing end of the lanyard cord is positioned within the bifurcated plug and then inserted as a combination into the center channel of the base portion. Upon further inward movement of the bifurcated plug, the plug forcibly closes about the lanyard cord to securely grip and therefore retain the trailing end of the lanyard cord within the center channel of the base portion. Importantly, once the bifurcated plug is forced into the center channel, the bifurcated plug cannot be removed therefrom and therefore permanently grips the lanyard cord.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
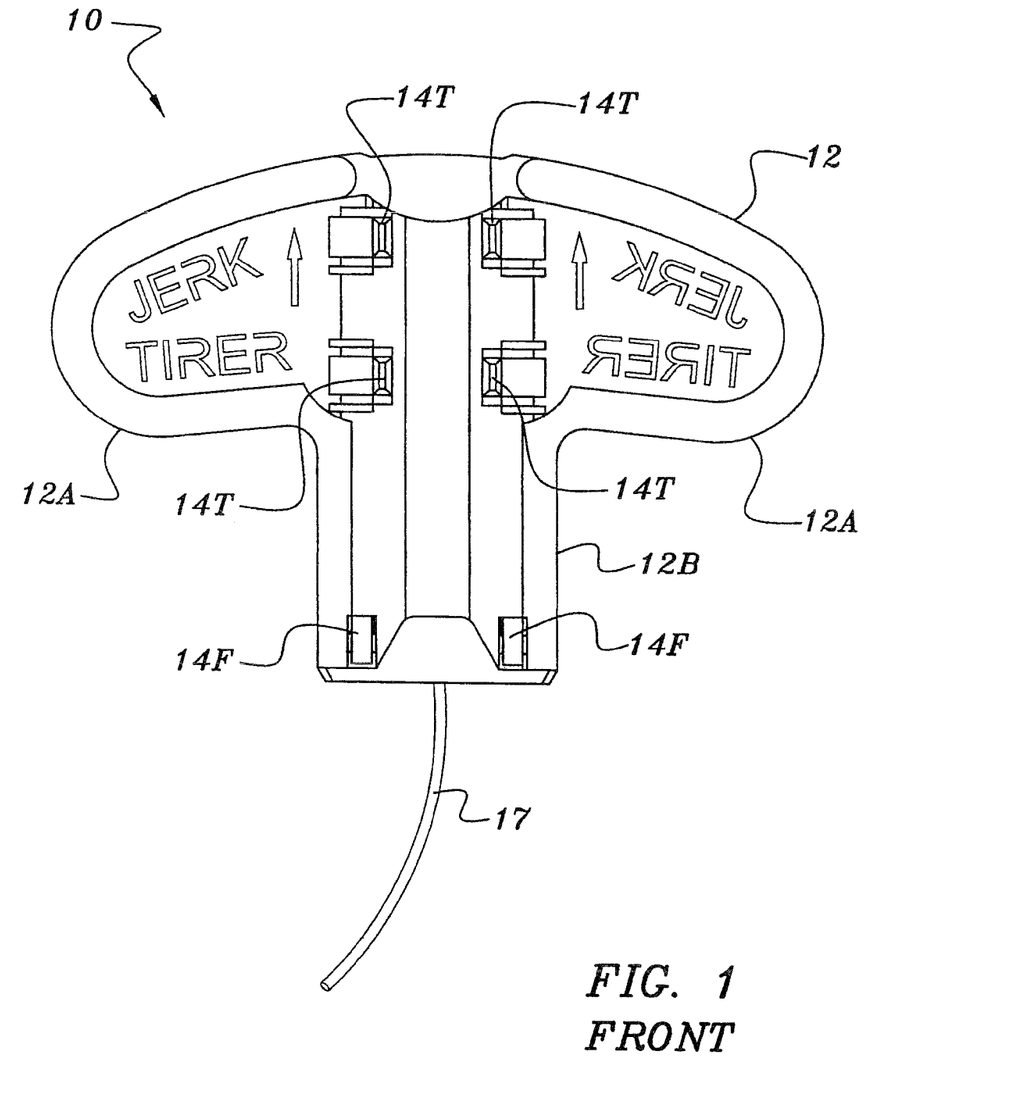
FIG. 1 is a front view of the first embodiment of the jerk handle of the invention.
Figure 2:
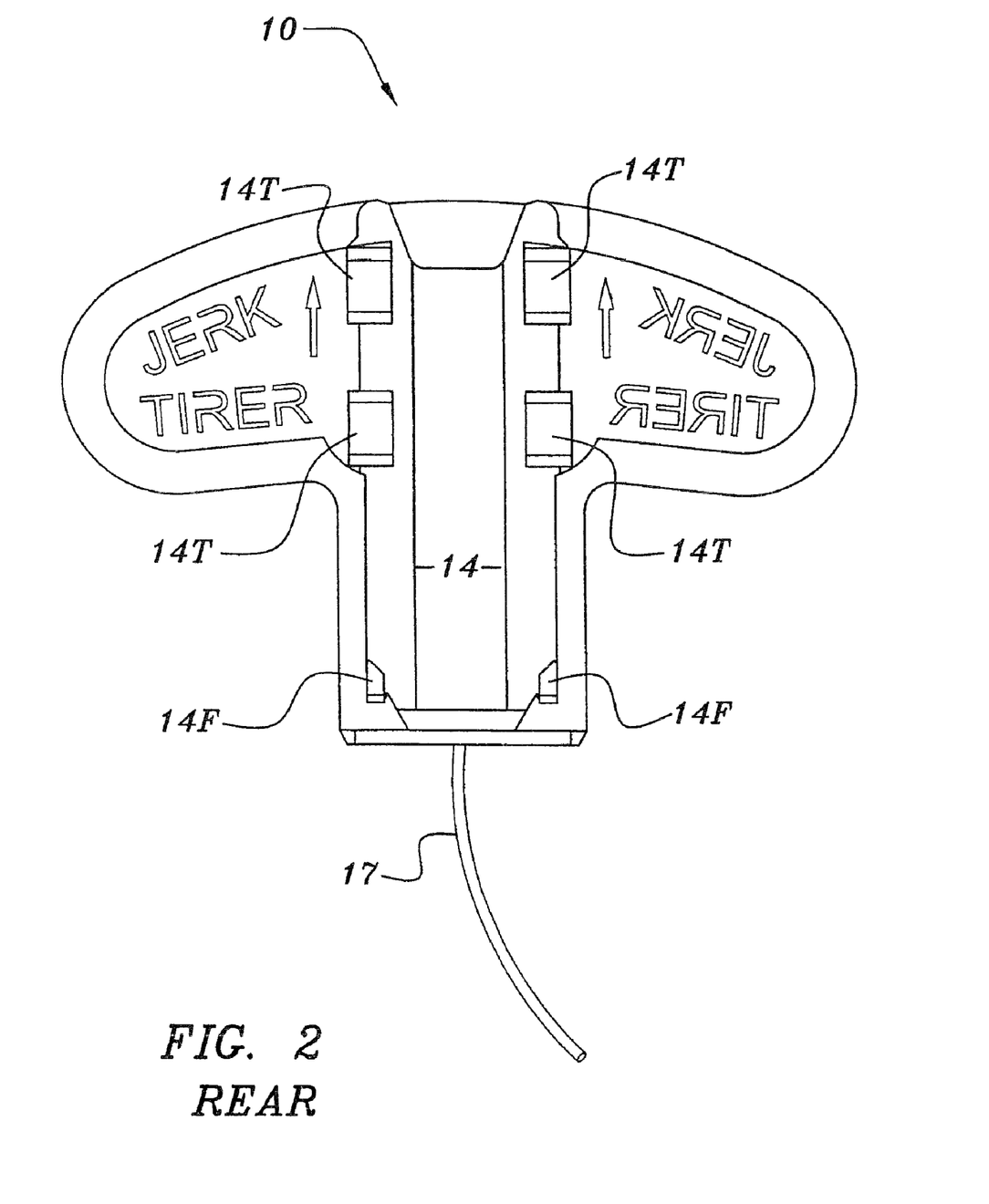
FIG. 2 is a rear view thereof showing the cap.
Figure 3:
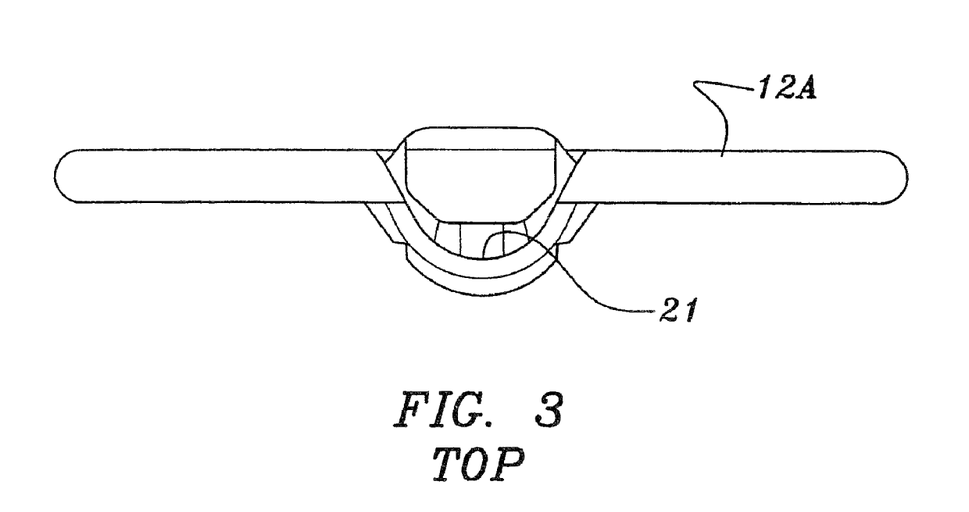
FIG. 3 is a top view thereof.
Figure 4:
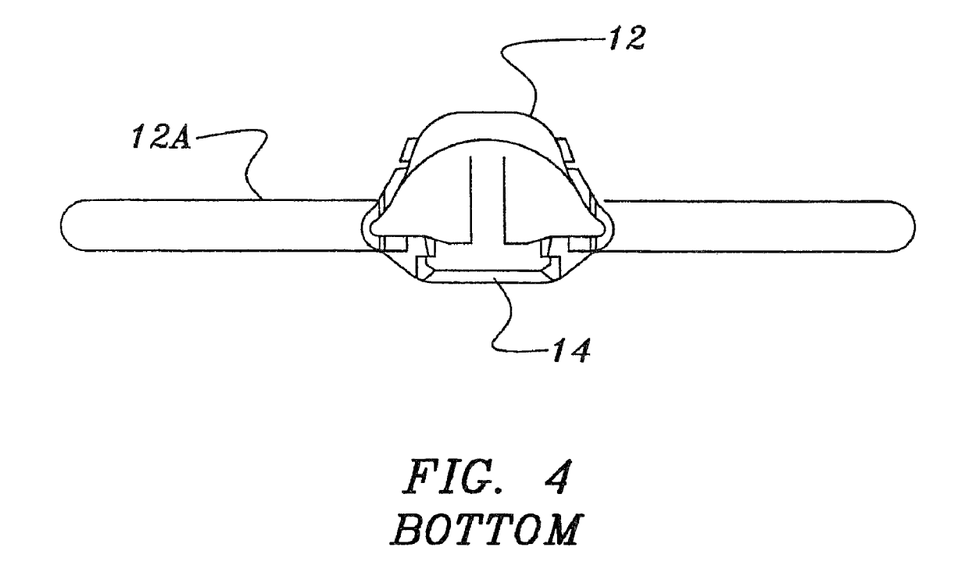
FIG. 4 is a bottom view thereof.
Figure 5:
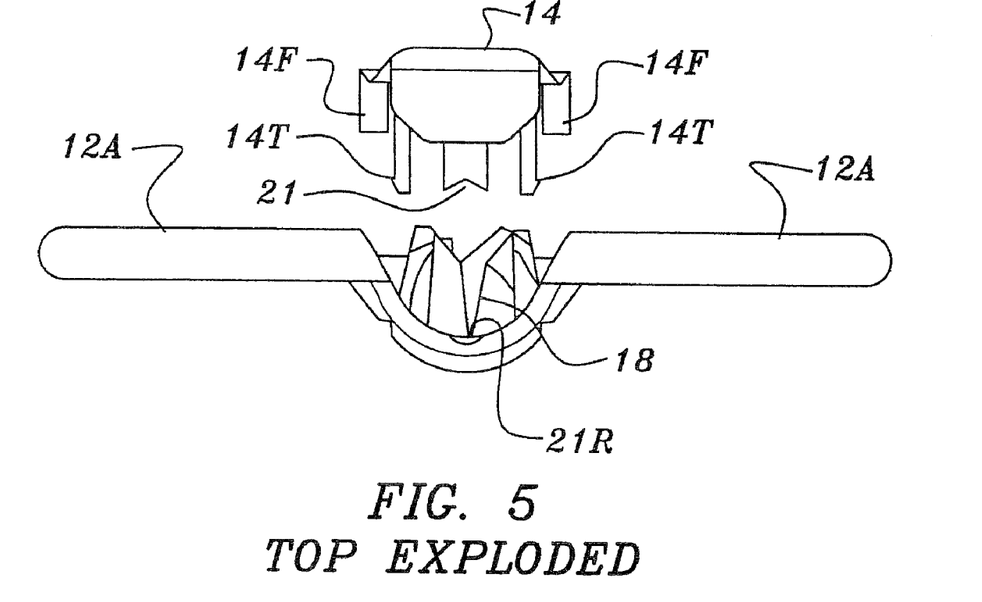
FIG. 5 is a top exploded view thereof.
Figure 6:
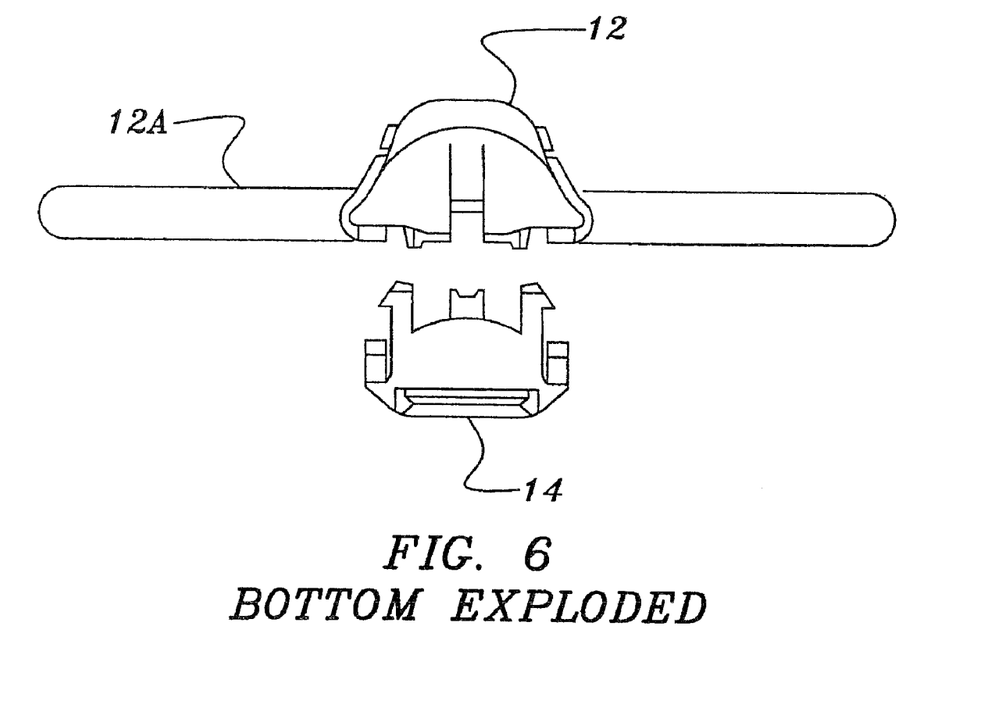
FIG. 6 is a bottom exploded view thereof.
Figure 7:
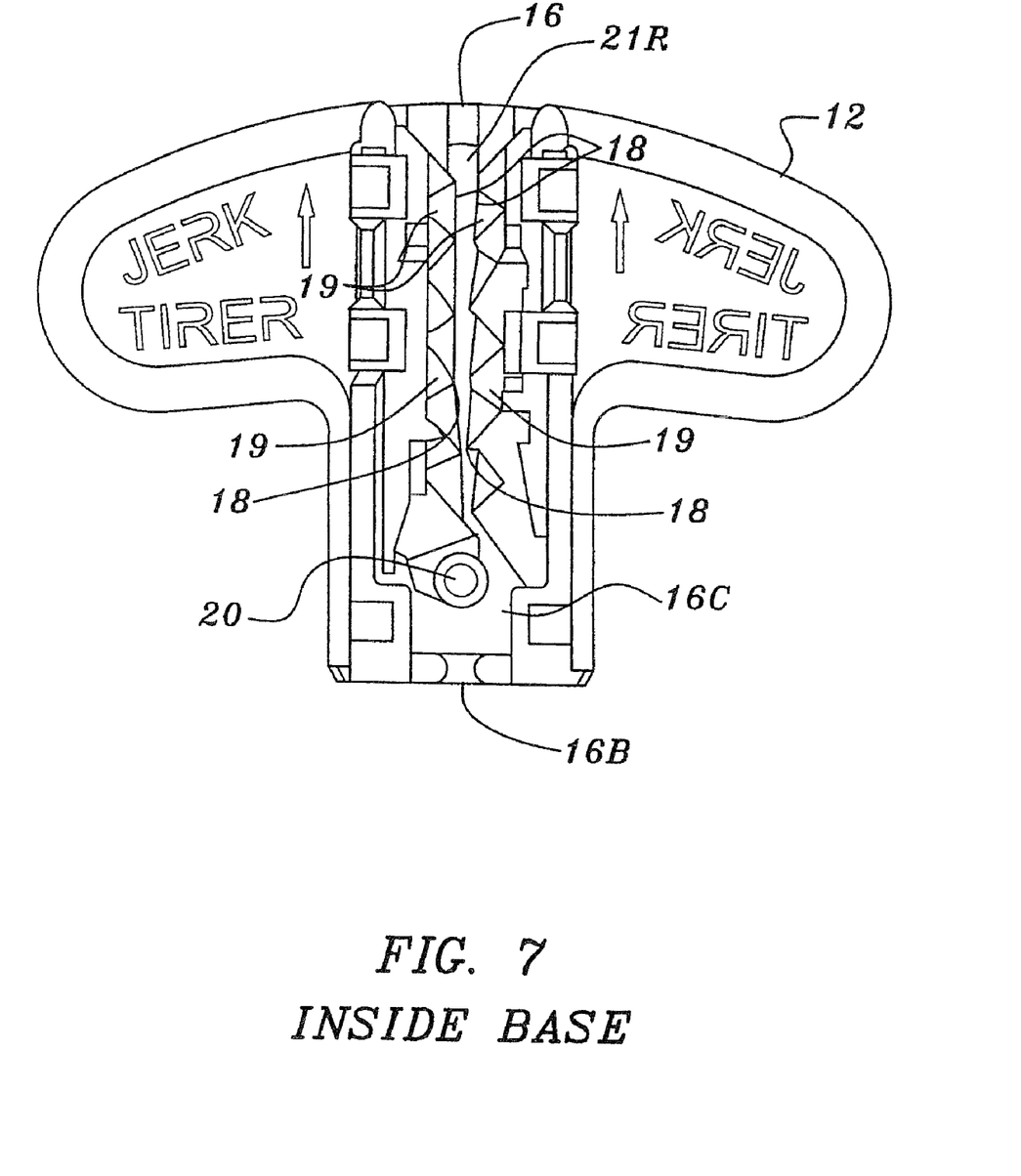
FIG. 7 is a rear view thereof showing the inside portion of the base portion with the cap removed.

As shown in FIGS. 1 and 2, the first embodiment of the jerk handle 10 of the invention comprises a base portion 12 with opposing handles 12A for easy grasping by a person's hand. Base portion 12 further comprises a neck portion 12B extending between the handle portions 12A.

As best shown in FIG. 2, the handle 10 further includes a cap 14 which is permanently snap-fitted to the base portion 12 by means of feet 14F that fit into corresponding slots in the neck 12B of the base portion, whereupon the cap 14 is then pivoted until four tabs 14T snap into similar slots formed in the handle portions 12A of the base portion 12. Alternatively, a living hinge may be employed in lieu of the two feet 14F.

Referring now to FIGS. 3-7, the inside of the rear of the base portion 12 comprises a center channel 16 for receiving a lanyard cord 17. The channel 16 is flanked by opposing slanted teeth 18 of upstanding ridges 19. The teeth 18 are preferably configured in the manner disclosed in U.S. Pat. No. 3,574,900, the disclosure of which is hereby incorporated by reference herein.

Toward the bottom of the channel 16, a circular upstanding protrusion 20 redirects the channel 16 about somewhat of a circular path 16C to exit the bottom 16B of the base portion 12. The teeth 18 coupled with the protrusion 20 form a circuitous path for receiving the lanyard cord 17 such that the lanyard cod 17 is firmly grasped between the teeth 18. Indeed, preferably the distance between the opposing teeth 18 gradually decreases from the protrusion 20 to the uppermost end of the channel such that the lanyard cord 17 is progressively grasped tighter and tighter along the length of the channel 16.

Figure 8:
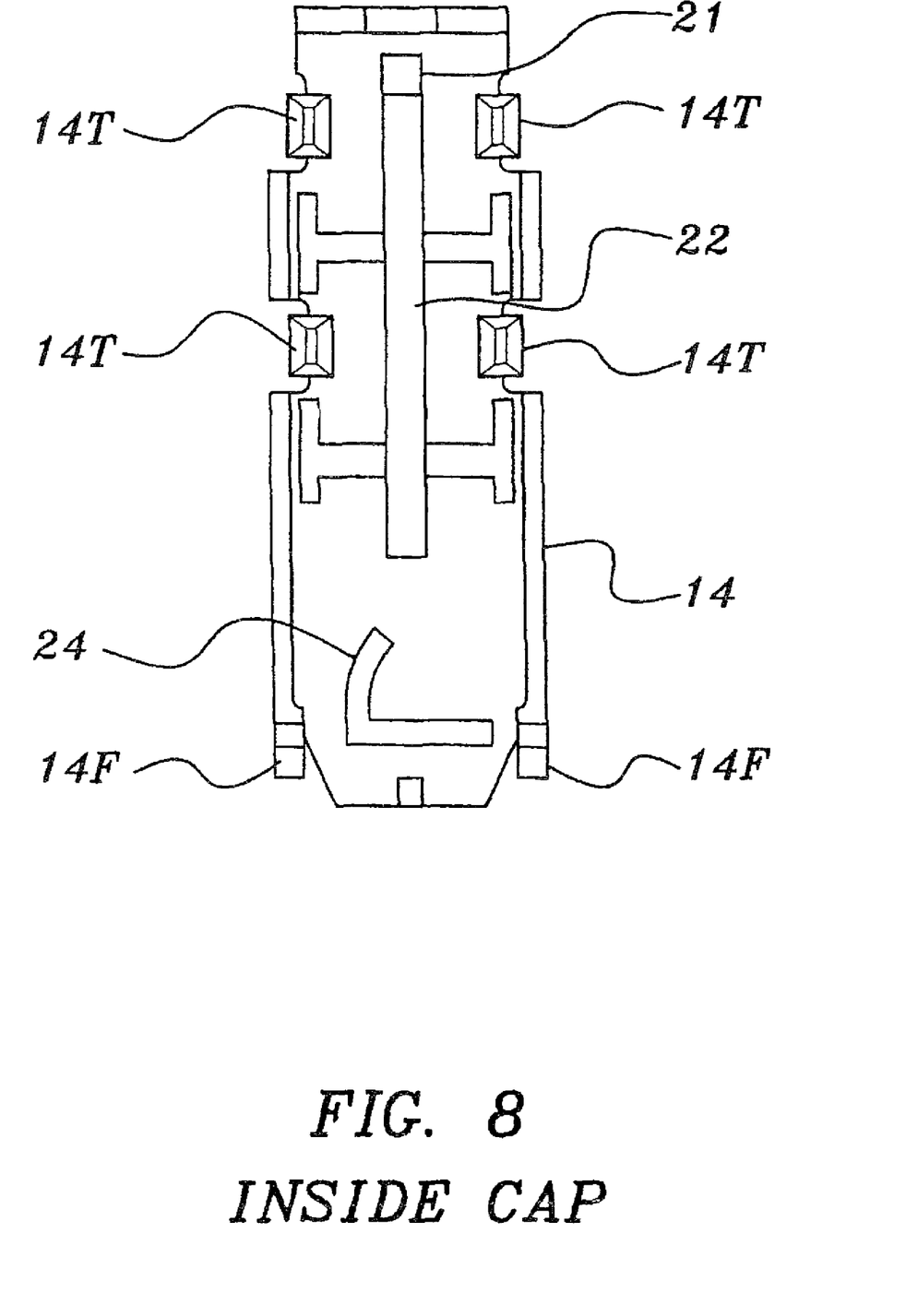
FIG. 8 is a view showing the inside of the rear of the jerk handle illustrating the matched opposing teeth which grip the lanyard cord to be positioned therebetween.
Figure 9:
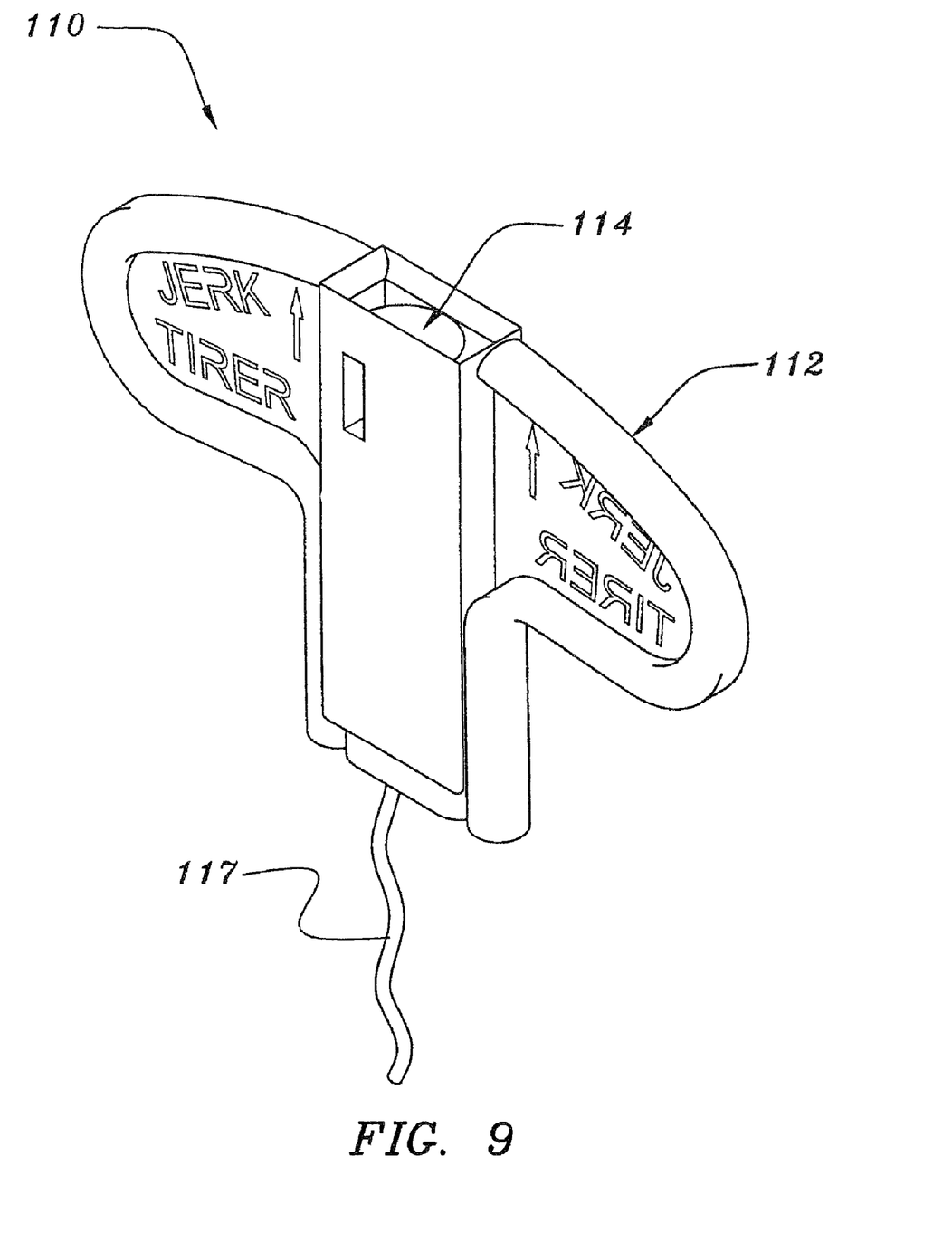
FIG. 9 is a perspective view of the second embodiment of the jerk handle of the invention.

As shown in FIG. 8, the lanyard cord 17 is forced into the channel 16 by means of the cap 14 having a longitudinal ridge 22 aligned with the channel 16 and dimensioned at a height to force the lanyard cord 17 to the bottommost portion of the channel 16 between the opposing teeth 18. Similarly, the inside of the cap 14 further includes an L-shaped ridge 24 of a configuration similar to that of the circuitous portion of the channel 16C such that the lanyard cord 17 is firmly forced therein when the cap 14 is assembled to the base portion. The cap 14 includes a protruding stay 21 with a V cut-out that forces the end of the cord 17 into a recess 21F. This assures that the cord 1 is firmly engaged by the teeth 18.

As shown in FIGS. 9-16, a second embodiment of the jerk handle 110 of the invention comprises a base portion 112 with opposing handles 112A for easy gripping by a person's hand. Base portion 112 further comprises a neck portion 112B extending between the handle portions 112A.

Figure 10:
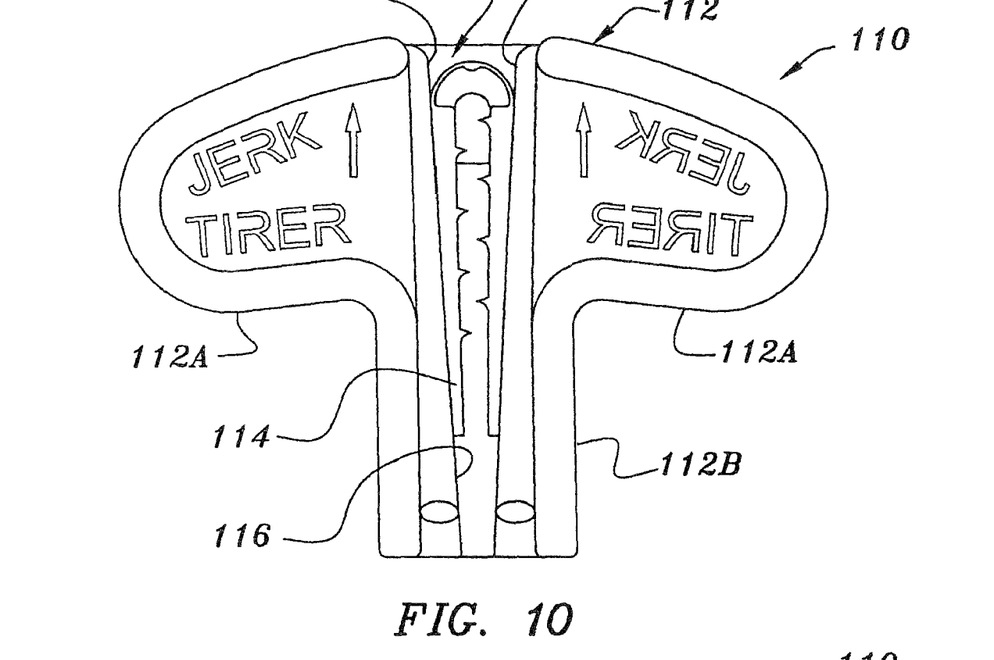
FIG. 10 is a front view thereof partially cut-away to show the bifurcated plug inserted into the center bore.
Figure 13:
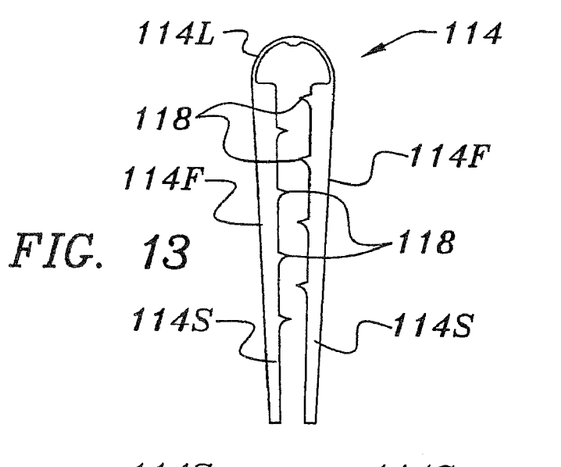
FIG. 13 is a front view of the bifurcated plug that is configured and dimensioned to be inserted into the center bore of the jerk handle.
Figures 14, 16:
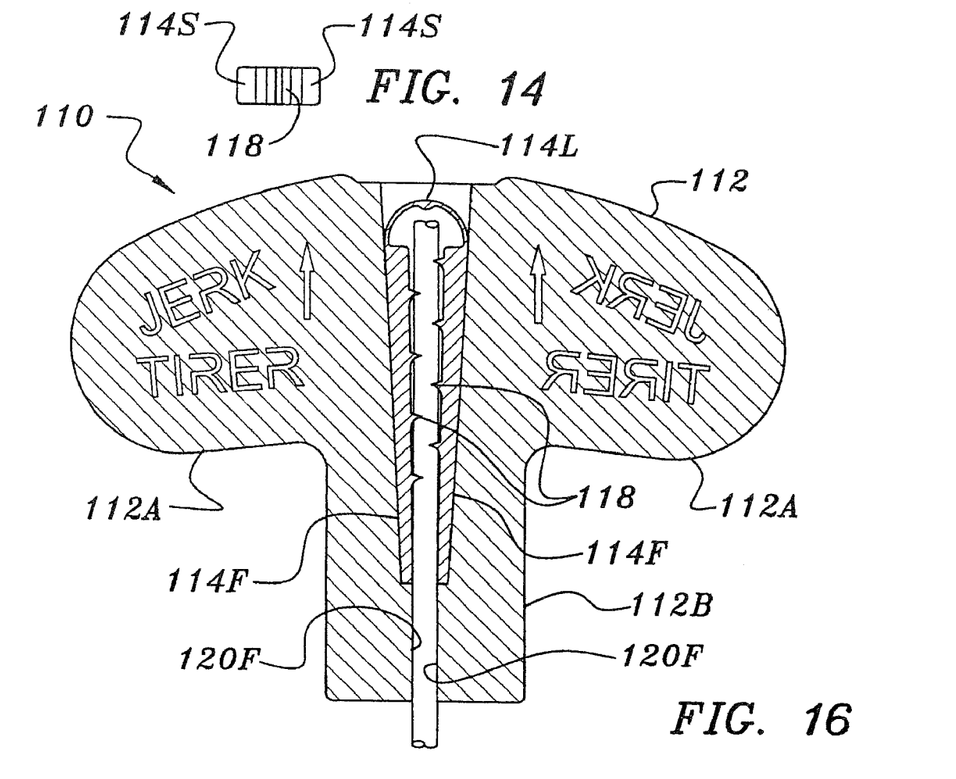
FIG. 14 is a bottom view thereof.
FIG. 16 is a cross-sectional view of FIG. 11 along lines 16-16 showing the insertion of the bifurcated plug within the center bore of the jerk handle.
Figure 15:
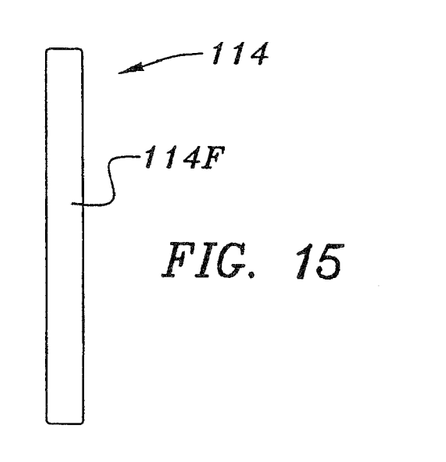
FIG. 15 is a right and left side view thereof.

The jerk handle 110 of the invention further includes a bifurcated plug 114 which is inserted into a center bore 116 formed within the neck portion 112B. As best shown in FIGS. 10 and 16, the center bore 116 preferably comprises a frustro cross-sectional configuration having a large diameter opening at its top and a smaller diameter opening at its bottom. Correspondingly, as best shown in FIGS. 13 and 16, the bifurcated plug 114 preferably comprises a mating frustro configuration having an enlarged top and a reduced bottom for slidable fitting into the center channel 116. The frustro configurations of the center channel 116 and the bifurcated plug 114 assure that the bifurcated plug 114 is compressed inwardly as it is forced into the center bore 116 from the top to the bottom thereof.

In its preferred embodiment, the bifurcated plug 114 comprises a bifurcated configuration similar to that of a conventional hair pin with cooperating left and right side portions 114S having inwardly disposed teeth 118 that are preferably slanted toward the top and staggered relative to one another. The side portions are preferably connected together by a loop portion 114L that essentially serves as a living hinge to allow the side portions 114S to move inwardly as the bifurcated plug 114 is forced into the center bore 116.

Figure 11:
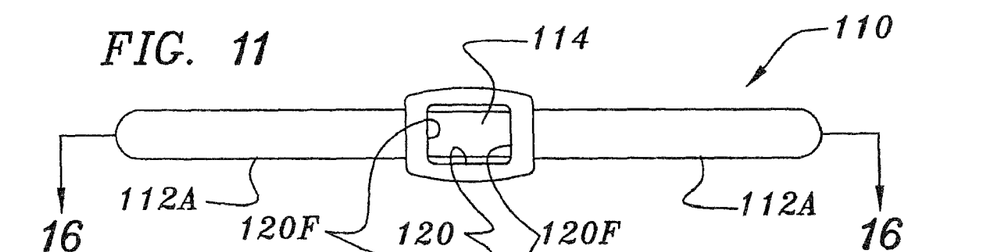
FIG. 11 is a top view thereof.
Figure 12:
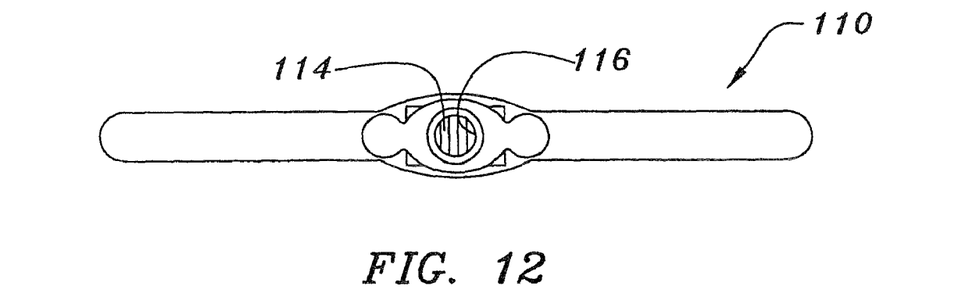
FIG. 12 is a bottom view thereof.

As best shown in FIGS. 11 and 12, the center bore 116 preferably comprises a roughly rectangular cross-sectional configuration having frustro lateral sides 120F that taper closer together from the top to the bottom of the bore 116 to slidably mate with the outermost surfaces of the side portions 114S of the bifurcated plug 14 as the plug 114 is forced therein. Without departing from the spirit of this invention, the center bore 116 and the bifurcated plug 114 may alternatively comprise other tapered configurations such as frustroconical configurations.

As best shown in FIG. 16, during assembly, the trailing end of the lanyard cord 117 is positioned between the side portions 114S of the bifurcated plug 114 to be grasped by the inwardly protruding teeth 118 thereof. With the lanyard cord 117 being threaded through the center channel 116, the bifurcated plug 114 is then aligned therewith and forced inwardly. As noted above, as the bifurcated plug 114 is forced inwardly within the center channel 116, the frustro sides 114F of the plug 114 slide along the frustro lateral sides 120F of the slot 120 forming the center bore 116 whereupon the sides 114S progressively squeeze the lanyard cord 117 therebetween tighter and tighter. As shown in FIG. 16, the dimensions of the bifurcated plug 114 relative to the center channel 16 and the lanyard cord 117, are such that the bifurcated plug 114 will be recessed in position within the center bore 116 once the lanyard cord 117 is permanently grasped. In this manner, since the bifurcated plug 114 does not protrude from the top of the jerk handle 10, it is virtually impossible to remove and can be considered to be permanently installed.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A lanyard handle, comprising in combination:

a base portion including a neck portion;

a center bore formed in said neck portion, said center bore having a width and lateral sides;

a bifurcated plug having said side portions inserted into said center bore, said side portions of said plug having outermost surfaces connected together by a loop portion having an outer surface that is uninterrupted with said outermost surfaces and having a width substantially equal to said width of said center bore, said loop portion allowing said side portions to move inwardly as said plug is forced into the center bore;

said lateral sides and said outermost surfaces comprising smooth configurations allowing slidable engagement therebetween; and one or both of said center bore and said plug comprising a frustro configuration to grasp a lanyard cord inserted between said side portions up to said loop portion as said plug is inserted into said center bore and to more tightly grasp the lanyard cord the deeper said plug slides into said center bore the more the lanyard cord is pulled.

2. The lanyard handle as set forth in claim 1, wherein both said center bore and said plug comprises mating frustro configuration to grasp said lanyard cord as said plug is inserted into said center bore.

3. The lanyard handle as set forth in claim 1, wherein said bifurcated plug comprises left and fight side inwardly disposed teeth.

4. The lanyard handle as set forth in claim 1, wherein said bifurcated teeth are staggered relative to one another.

5. The lanyard handle as set forth in claim 1, wherein said loop portion of said bifurcated plug is recessed within the center bore once said lanyard cord is grasped.

6. The lanyard handle as set forth in claim 1, wherein said base portion is integrally formed and wherein said plug is integrally formed.

* * * * *

UNITED STATES PATENT AND TRADEMARK OFFICE
CERTIFICATE OF CORRECTION

| | | |
|---|---|---|
| PATENT NO. | : 8,141,208 B2 | Page 1 of 1 |
| APPLICATION NO. | : 12/435760 | |
| DATED | : March 27, 2012 | |
| INVENTOR(S) | : Lyman W. Fawcett, Jr. | |

It is certified that error appears in the above-identified patent and that said Letters Patent is hereby corrected as shown below:

Col. 6, line 4, Claim 3, line 2, the term "fight" should be "right".

Signed and Sealed this
Eighth Day of May, 2012

David J. Kappos
*Director of the United States Patent and Trademark Office*